Nov. 9, 1926.
A. J. BENNETT
1,606,687
METHOD OF MAKING FLOWER VASE INSERTS
Filed March 12, 1924     2 Sheets-Sheet 2
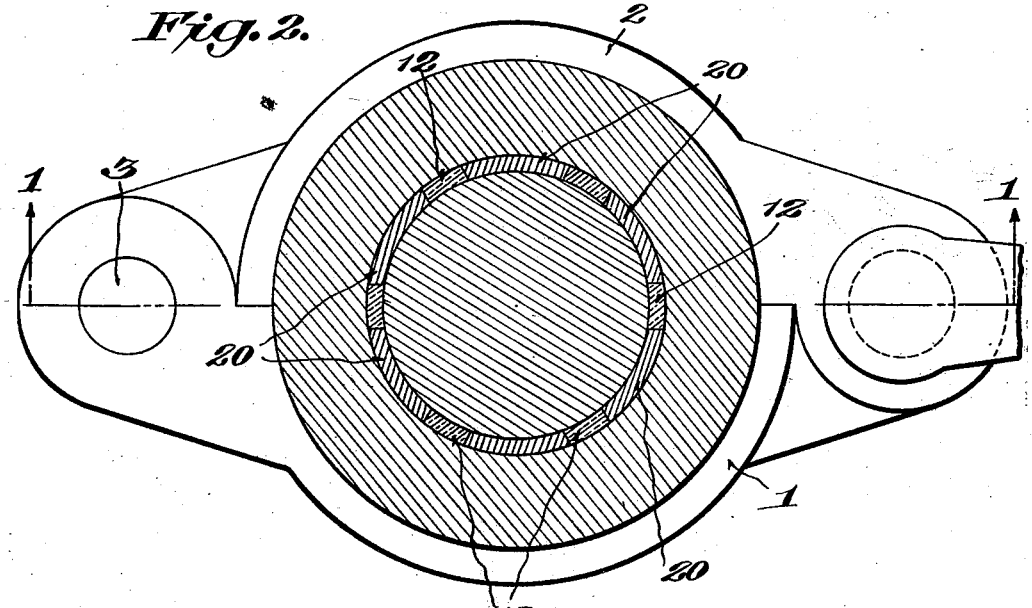
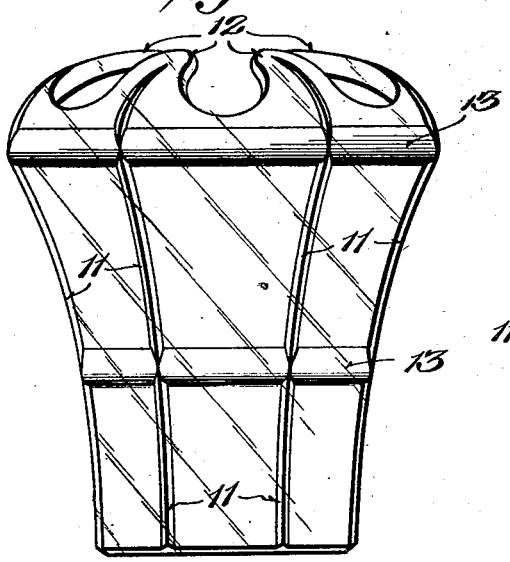
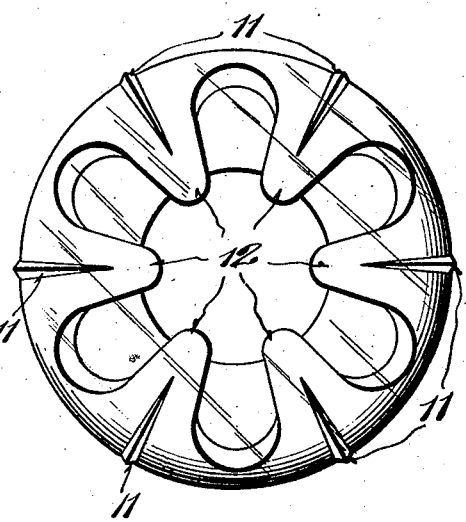
Inventor
Arthur J. Bennett
Witness:—
Chas. L. Griesbauer
By _____
Attorney Patented Nov. 9, 1926.

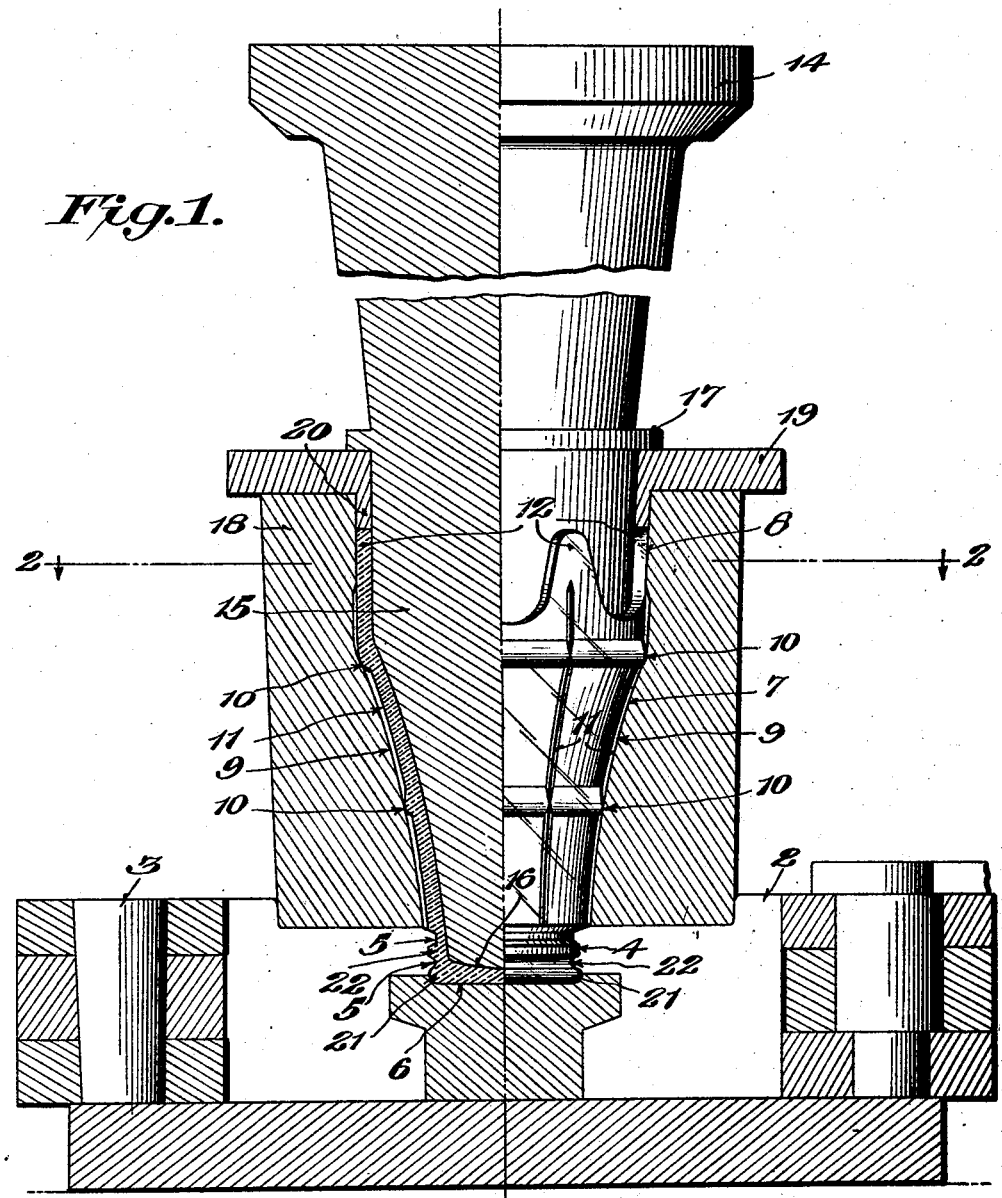

1,606,687

UNITED STATES PATENT OFFICE.

ARTHUR JAMES BENNETT, OF CAMBRIDGE, OHIO.

METHOD OF MAKING FLOWER-VASE INSERTS.

Application filed March 12, 1924. Serial No. 698,746.

This invention relates to certain new and useful improvements in method of making flower vase inserts and the primary object thereof is to provide a simplified method for enabling the inserts to be expeditiously and economically produced.

A further object of the invention is to provide a method which enables the inserts to be produced by pressing, as distinguished from blowing thereby to assure uniformity in production.

The invention has still further and other objects which will be later set forth and manifested in the course of the following description.

In the drawings:—

Figure 1, is a side elevation, partly in section on line 1—1 of Figure 2, showing the pressing of an insert;

Figure 2, is a section on line 2—2 of Figure 1;

Figure 3, is a side elevation of the completed insert, and

Figure 4, is a top plan view of Figure 3.

In proceeding in accordance with the present invention, a mold is employed composed of two complementary sections 1 and 2 which are hinged together at 3. The base of the mold is formed with a circular cavity 4, having a bottom wall 6, the circumferential wall of the cavity being formed with spaced annular grooves 5. The body 18 of the mold is formed with a chamber or cavity 7 conforming to the external shape which the insert is to possess and is further provided with an upper extension 8 in which latter the spikes or fingers 12 of the insert are formed. The wall defining the cavity or chamber 7 is further provided with spaced vertical grooves 9 and circumferential grooves 10 whereby the insert will be formed with corresponding longitudinal and circumferential ribs 11 and 13 respectively.

A plunger or pressure head 14 is movable into the mold chamber or interior and has a stem 15 the major portion of which, in external contour, conforms to the shape of the chamber 7. The lower extremity of the stem 15 projects below the lower end of the chamber 7 and into the cavity 4 and with its bottom 16 spaced from the bottom 6 of the cavity 4.

In order to form the spikes or fingers 12, a ring is employed which includes a top 19 seating on the upper face of the body 18 of the mold and a depending circular collar 20 the latter being scalloped reversely to the scalloped formation which the spikes 12 present. The collar 20 engages against the circumferential wall of the chamber 7 and receives the plunger 14 on its interior. The plunger 14 is provided with a flange 17 which engages with the form top 19 and limits inward movement of the plunger relative to the mold.

In operation, the molten glass is placed in the mold and the plunger then forced therein, causing the spikes to initially have a vertical disposition and the product a closed bottom 21 connected thereto by a neck portion 22. After cooling, the product is removed from the mold, placed in a snap and then heated, whereupon the spikes are turned over with a wooden paddle (not shown) to assume the position in the finished article, as depicted in Figure 3 of the drawings. The article is then allowed to slightly cool, is tempered, and the bottom part cracked off and ground, which completes the process.

From the foregoing it will be apparent that the pressing of the articles in a mold of any defined and desired shape not only assures uniformity in production, but enables more economical production, as compared to blowing, owing to the expense of skilled labor in making blown ware of this character. The inturning of the spikes is easily and quickly accomplished by the ordinary finishing process of rubbing in with a finishing tool, to the desired disposition, whereby the spikes will be caused to lie in a common plane and thus effect symmetry in appearance.

Obviously, the mold may be composed of more than two sections if desired, and a suitable finishing tool of any character employed, i. e., whether a wood or metal paddle or otherwise, and other changes resorted to as may fall within the scope of the claims.

The finished product is employed in connection with vases and is placed in the top of the vase to permit the use of but a few flowers in vases having large necks, and which otherwise would require the use of a large number of flowers to make an effective display as set forth in my Letters Patent No. 1,539,153 dated May 26, 1925. By use of the present product a half dozen flowers will serve the purpose of one or two dozen, since each flower is individually displayed and held against drooping over the vase sides.

What is claimed is:—

1. The hereindescribed method of making flower vase inserts, which consists in pressing a mass of glass into the form of a hollow body and in confining the axial and lateral movements of the mass to form a series of spaced spikes extending axially outwardly from the upper end of the body, and simultaneously forming the body with a weakened neck having a closed bottom at the lower end of the body, then in heating the spikes and individually bending same inwardly to lie laterally of the body and with their sides spaced and with their tips arranged in a circular series surrounding the axis of the body, then in cooling, tempering, and finally in breaking off the neck and its bottom and grinding the resultant edge.

2. The hereindescribed method of making flower vase inserts, which consists in pressing a mass of glass into the form of a hollow body and in confining the axial and lateral movements of the mass to form a series of spaced spikes extending axially outwardly from an end of the body, then in heating the spikes and individually bending same inwardly to lie laterally of the body and with their sides spaced and with their tips arranged in a circular series surrounding the axis of the body.

In testimony whereof I affix my signature.

ARTHUR JAMES BENNETT.